Patented June 10, 1952

2,599,549

UNITED STATES PATENT OFFICE 2,599,549

PRODUCTION OF ALPHA-CARBALKOXY-ALKYL METHACRYLATES

Charles H. Fisher, New Orleans, La., Edward M. Filachione, Philadelphia, Pa., and Martin L. Fein, Riverside, N. J., assignors to the United States of America as represented by the Secretary of Agriculture No Drawing. Application March 21, 1950, Serial No. 151,056

3 Claims. (Cl. 260—484)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by the Government of the United States of America for governmental purposes throughout the world without the payment to us of any royalty thereon.

This application is a continuation in part of our copending application Serial No. 643,446 filed January 25, 1946, now abandoned.

This invention relates to a method for the preparation of α-carbalkoxyalkyl methacrylates.

We have found that an alcohol ester of α-methacryloxy carboxylic acid is formed as the principal reaction product on thermal decomposition of the corresponding α-acetoxyisobutyrate, according to the following equation:

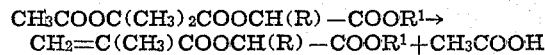

$$CH_2=C(CH_3)COOCH(R)-COOR^1+CH_3COOH$$

wherein R is hydrogen or an alkyl group and —COOR¹ represents the alcohol ester group.

In accordance with the method of our invention the alcohol ester of α-(α-acetoxyisobutyroxy) carboxylic acid is pyrolyzed by heating in the vapor phase at a temperature of from about 400° to about 550° C., and the resulting α-carbalkoxyalkyl methacrylate is recovered from the pyrolyzate by any suitable procedure, for instance by cooling the reaction products and fractionating the resulting liquid condensate.

The process of our invention is applicable to the pyrolysis of alcohol esters of saturated aliphatic α-(α-acetoxyisobutyroxy) monocarboxylic acids in general. Suitable alcohol esters include for instance esters of primary, monohydric, aromatic, heterocyclic, aliphatic, monoolefinic and saturated alcohols, which may contain substituents such as halogen and alkoxy groups.

The process is especially well adapted for the production of α-carbalkoxyalkyl methacrylates of such alcohols from the corresponding alcohol esters of α-acetoxyisobutyrates of glycolic and lactic acid. The α-carbalkoxyalkyl methacrylates resulting from the pyrolysis process of our invention are polymerizable compounds which are useful as intermediates in the production of synthetic resins. The following examples illustrate the invention:

The acetoxyisobutyrate of hydroxyesters were pumped to the top of an electrically heated pyrolysis chamber consisting of a vertical Pyrex glass tube, 25 mm. in diameter, packed with short lengths of Pyrex glass tubing. In Examples I through V the pyrolysis tube was heated over a length of 66 cm., the free space of heated zone was 123 ml. and the automatically controlled temperature was measured by means of a thermocouple located in a well at a point 1.5 cm. above the bottom of the heated zone. In Examples VI through XI the pyrolysis tube was heated over a length of 33 cm., the free space of the heated zone was 78 ml. and the thermocouple was located 10 cm. from the bottom of the heated zone.

In all the experiments the pyrolyzate was condensed in a water cooled condensed and Dry Ice trap at the bottom of the pyrolysis tube, and an aliquot was titrated for free acidity (calculated as acetic acid). Hydroquinone was added to minimize polymerization and the condensate was fractionated in vacuum in an atmosphere of carbon dioxide. The experimental data thus obtained are shown in the following table:

| Example No. | Ester pyrolyzed, g. Acetoxyisobutyrate of: | Temp., °C. | Feed rate, g./min. | Ester decomp., Per Cent | Yields, moles per mole of ester destroyed | |
|---|---|---|---|---|---|---|
| | | | | | Methacrylate | Acetic Acid |
| I | Me-glycolate, 102 | 501 | 2.88 | 100 | 0.81 | 0.98 |
| II | Me-glycolate, 95 | 551 | 2.58 | 100 | 0.74 | 1.0 |
| III | Me-lactate, 100 | 451 | 3.77 | 85 | 0.65 | 0.87 |
| IV | Me-lactate, 100 | 500 | 4.3 | 100 | 0.56 | 1.07 |
| V | Et-lactate, 100 | 450 | 3.37 | 89 | 0.57 | 0.88 |
| VI | Allyl lactate, 147 | 446 | 2.0 | 79 | 0.82 | 0.92 |
| VII | Methallyl lactate, 346 | 450 | 2.8 | 63 | 0.85 | 0.97 |
| VIII | Allyl glycolate, 130 | 450 | 2.4 | 69 | 0.78 | 0.96 |
| IX | Benzyl lactate, 159 | 450 | 2.4 | 65 | 0.71 | 0.92 |
| X | Tetrahydrofurfuryl lactate, 288 | 450 | 2.3 | 68 | 0.65 | 0.93 |
| XI | Beta chloroethoxy ethyl lactate, 144 | 450 | 2.7 | 66 | 0.79 | 0.88 |

We claim:

1. The process of producing the methacrylate of methyl lactate which comprises thermally decomposing the acetoxyisobutyrate of methyl lactate at about 450° to 550° C.

2. The process of producing an alkyl α-methacryloxy propionate corresponding to the formula $$CH_2=C(CH_3)COOCH(CH_3)-COO-Alkyl$$

which comprises pyrolyzing the corresponding α-acetoxyisobutyrate of the formula $$CH_3COOC(CH_3)_2COOCH(CH_3)COO-Alkyl$$

by heating at about 450° to 550° C.

3. The process of producing an ester of an α-methacryloxy carboxylic acid of the general formula $$CH_2=C(CH_3)-\overset{O}{\underset{\|}{C}}-O-R-COOH$$

wherein —R— is a saturated aliphatic hydrocarbon radical having not more than 2 carbon atoms; which comprises pyrolyzing by heating in the vapor phase at about 450° to 550° C., the corresponding alcohol ester of the α-(α-acetoxy isobutyroxy) carboxylic acid of the general formula $$CH_3-\overset{O}{\underset{\|}{C}}-O-C(CH_3)_2-\overset{O}{\underset{\|}{C}}-O-R-COOH$$

wherein R has the above stated significance.

CHARLES H. FISHER.
EDWARD M. FILACHIONE.
MARTIN L. FEIN.

REFERENCES CITED

The following references are of record in the file of this patent:

UNITED STATES PATENTS

| Number | Name | Date |
|---|---|---|
| 2,367,798 | Rehberg | Jan. 23, 1945 |
| 2,388,440 | Rehberg | Nov. 6, 1945 |